US012475246B2

(12) United States Patent
Mori

(10) Patent No.: US 12,475,246 B2
(45) Date of Patent: Nov. 18, 2025

(54) SECRET SEARCH SYSTEM, SECRET SEARCH METHOD, AND NON-TRANSITORY COMPUTER READABLE MEDIUM

(71) Applicant: Mitsubishi Electric Corporation, Tokyo (JP)

(72) Inventor: Ikumi Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 85 days.

(21) Appl. No.: 18/632,778

(22) Filed: Apr. 11, 2024

(65) Prior Publication Data

US 2024/0256695 A1    Aug. 1, 2024

Related U.S. Application Data

(63) Continuation of application No. PCT/JP2021/046136, filed on Dec. 14, 2021.

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01)

(58) Field of Classification Search
None
See application file for complete search history.

(56) References Cited

U.S. PATENT DOCUMENTS

2005/0259817 A1* 11/2005 Ramzan ............... H04L 9/3013
380/46
2006/0179050 A1*  8/2006 Giang ................. G06F 16/3346
707/999.005
(Continued)

FOREIGN PATENT DOCUMENTS

CN    110489998 B  *  2/2021  ......... G06F 21/6209
JP    2008-500598 A     1/2008
(Continued)

OTHER PUBLICATIONS

International Search Report (PCT/ISA/210) issued in PCT/JP2021/046136, dated Mar. 15, 2022.
(Continued)

*Primary Examiner* — Venkat Perungavoor
(74) *Attorney, Agent, or Firm* — Birch, Stewart, Kolasch & Birch, LLP

(57) ABSTRACT

In a secret search system based on probabilistic encryption, a registration client device (20) registers data (201) to be searched for in secrecy and a keyword (200) corresponding to the data (201) in a secret search server device, and discloses disclosure bits, which are data to be externally disclosed and are part of data calculated deterministically using each keyword (200) registered in the secret search server device and a salt corresponding to each keyword (200) registered in the secret search server device. The registration client device (20) includes a disclosure bit calculation unit (240) to determine, as a determined salt, a salt corresponding to a registration keyword, which is the keyword (200) to be registered in the secret search server device. The disclosure bit calculation unit (240) determines the determined salt, taking into consideration a size of a bias in a distribution composed of disclosure bits already disclosed by the registration client device (20) and disclosure
(Continued)

bits calculated using the registration keyword and the determined salt.

9 Claims, 17 Drawing Sheets

(51) Int. Cl.
*G06F 21/71* (2013.01)
*G06F 21/78* (2013.01)

(56) References Cited

U.S. PATENT DOCUMENTS

| | | | |
|---|---|---|---|
| 2009/0182729 A1* | 7/2009 | Lu | G06F 16/3322 707/999.005 |
| 2009/0190751 A1 | 7/2009 | Ramzan et al. | |
| 2009/0190752 A1 | 7/2009 | Ramzan et al. | |
| 2009/0193000 A1 | 7/2009 | Ramzan et al. | |
| 2009/0193033 A1 | 7/2009 | Ramzan et al. | |
| 2009/0248639 A1* | 10/2009 | Sasaki | H04N 1/00278 |
| 2013/0332729 A1 | 12/2013 | Ito et al. | |
| 2015/0046450 A1 | 2/2015 | Yoshino et al. | |
| 2015/0371062 A1 | 12/2015 | Ito et al. | |
| 2018/0039792 A1* | 2/2018 | Ohara | G06F 21/6227 |
| 2018/0365433 A1 | 12/2018 | Hayasaka et al. | |
| 2019/0163934 A1 | 5/2019 | Ito et al. | |

FOREIGN PATENT DOCUMENTS

| | | |
|---|---|---|
| JP | 5442161 B2 | 3/2014 |
| JP | 2015-35072 A | 2/2015 |
| JP | 5963936 B2 | 8/2016 |
| JP | 6239213 B1 | 11/2017 |
| JP | 6381861 B2 | 8/2018 |
| JP | 2020-109447 A | 7/2020 |
| JP | 2021-18517 A | 2/2021 |

OTHER PUBLICATIONS

Ito et al. "Efficient Searchable Encryption Schemes Against Frequency Analysis", IEICE, vol. 110, No. 443, Feb. 24, 2011, pp. 1-7.

* cited by examiner

SECRET SEARCH SYSTEM, SECRET SEARCH METHOD, AND NON-TRANSITORY COMPUTER READABLE MEDIUM

CROSS REFERENCE TO RELATED APPLICATION

This application is a Continuation of PCT International Application No. PCT/JP2021/046136, filed on Dec. 14, 2021, which is hereby expressly incorporated by reference into the present application.

TECHNICAL FIELD

The present disclosure relates to a secret search system, a secret search method, and a secret search program.

BACKGROUND ART

In a cloud system, a client under management as a customer can be trusted, but an administrator of a public cloud, who is a third party, cannot be completely trusted. Therefore, in order to protect data on a cloud server and its processing process, a searchable encryption technique that allows a search in an encrypted state is used. However, a problem of an existing searchable encryption technique that exhaustively compares trapdoors and tags is a slow processing speed.

Therefore, in a searchable encryption technique based on probabilistic encryption, there is a speed-up method that uses disclosure bits, which are a value calculated deterministically from a keyword, so as to reduce a space for comparison between tags and trapdoors. In this speed-up method, the longer the disclosure bits, the smaller the space for comparison and thus the greater a speed-up effect. However, a problem is that the longer the disclosure bits, the closer a frequency distribution of disclosure bits and a frequency distribution of keywords, so that the longer the disclosure bits, the higher a risk of a frequency analysis attack. When the disclosure bits are short, the risk of a frequency analysis attack is small, but the space for comparison is not so small, so that the speed-up effect is small.

CITATION LIST

Patent Literature

Patent Literature 1: JP 5442161 B

SUMMARY OF INVENTION

Technical Problem

Patent Literature 1 discloses a technique in which in order to reduce a risk of a frequency analysis attack while maintaining a speed-up effect in a searchable encryption technique based on deterministic encryption, transformed keywords the number of which is proportional to an occurrence frequency of a keyword are prepared, and the keyword is replaced with one of the prepared transformed keywords according to a transformation probability, and the transformed keyword that has replaced the keyword is encrypted and then registered in a server device.

However, according to the technique disclosed in Patent Literature 1, a problem is that occurrence frequencies of keywords are required in advance.

An object of the present disclosure is to reduce a risk of a frequency analysis attack while maintaining a speed-up effect and without requiring occurrence frequencies of keywords in advance in a searchable encryption technique based on probabilistic encryption.

Solution to Problem

A secret search system according to the present disclosure employs a searchable encryption technique based on probabilistic encryption, and the secret search system includes
a registration client device to register at least one piece of data to be searched for in secrecy and at least one keyword corresponding to each of the at least one piece of data in a secret search server device, and disclose disclosure bits, the disclosure bits being data to be externally disclosed and being part of data calculated deterministically using each keyword registered in the secret search server device and a salt corresponding to each keyword registered in the secret search server device,
wherein the registration client device includes
a disclosure bit calculation unit to determine a salt corresponding to a registration keyword as a determined salt, the registration keyword being a keyword to be registered in the secret search server device, and
wherein the disclosure bit calculation unit determines the determined salt, taking into consideration an extent of a bias in a distribution composed of disclosure bits already disclosed by the registration client device and disclosure bits calculated using the registration keyword and the determined salt.

Advantageous Effects of Invention

According to the present disclosure, a secret search system that employs a searchable encryption technique based on probabilistic encryption includes a registration client device, and the registration client device includes a disclosure bit calculation unit that determines a determined salt, taking into consideration a size of a bias in a distribution composed of disclosure bits already disclosed by the registration client device and disclosure bits calculated using a registration keyword and the determined salt. The registration keyword is a keyword to be registered in a secret search server device, and the determined salt is a salt corresponding to the registration keyword. Therefore, according to the present disclosure, a risk of a frequency analysis attack can be reduced while maintaining a speed-up effect and without requiring occurrence frequencies of keywords in advance in a searchable encryption technique based on probabilistic encryption.

DESCRIPTION OF EMBODIMENTS

In the description and drawings of embodiments, the same elements and corresponding elements are denoted by the same reference sign. The description of elements denoted by the same reference sign will be suitably omitted or simplified. Arrows in figures mainly indicate flows of data or flows of processing. "Unit" may be suitably interpreted as "circuit", "step", "procedure", "process", or "circuitry".

Embodiment 1

This embodiment will be described in detail below with reference to the drawings.

Description of Configuration

Figure 1:
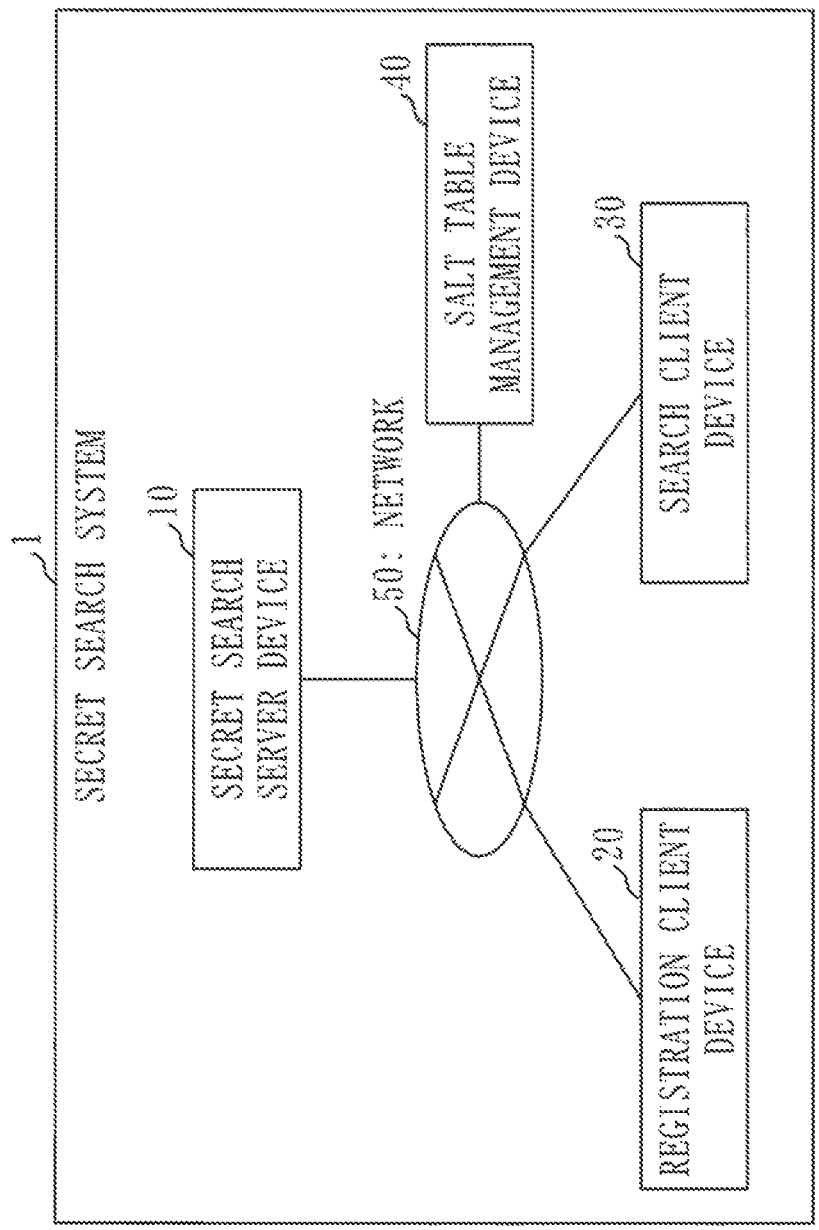
FIG. 1 is a figure illustrating an example of a configuration of a secret search system 1 according to Embodiment 1.

FIG. 1 illustrates an example of a configuration of a secret search system 1 according to this embodiment. The secret search system 1 employs a searchable encryption technique based on probabilistic encryption, and includes a secret search server device 10, a registration client device 20, a search client device 30, and a salt table management device 40, as illustrated in this figure. The devices included in the secret search system 1 are communicably connected via a network 50. There may be two or more of each device included in the secret search system 1. At least two devices included in the secret search system 1 maybe integrally configured as appropriate.

Figure 2:
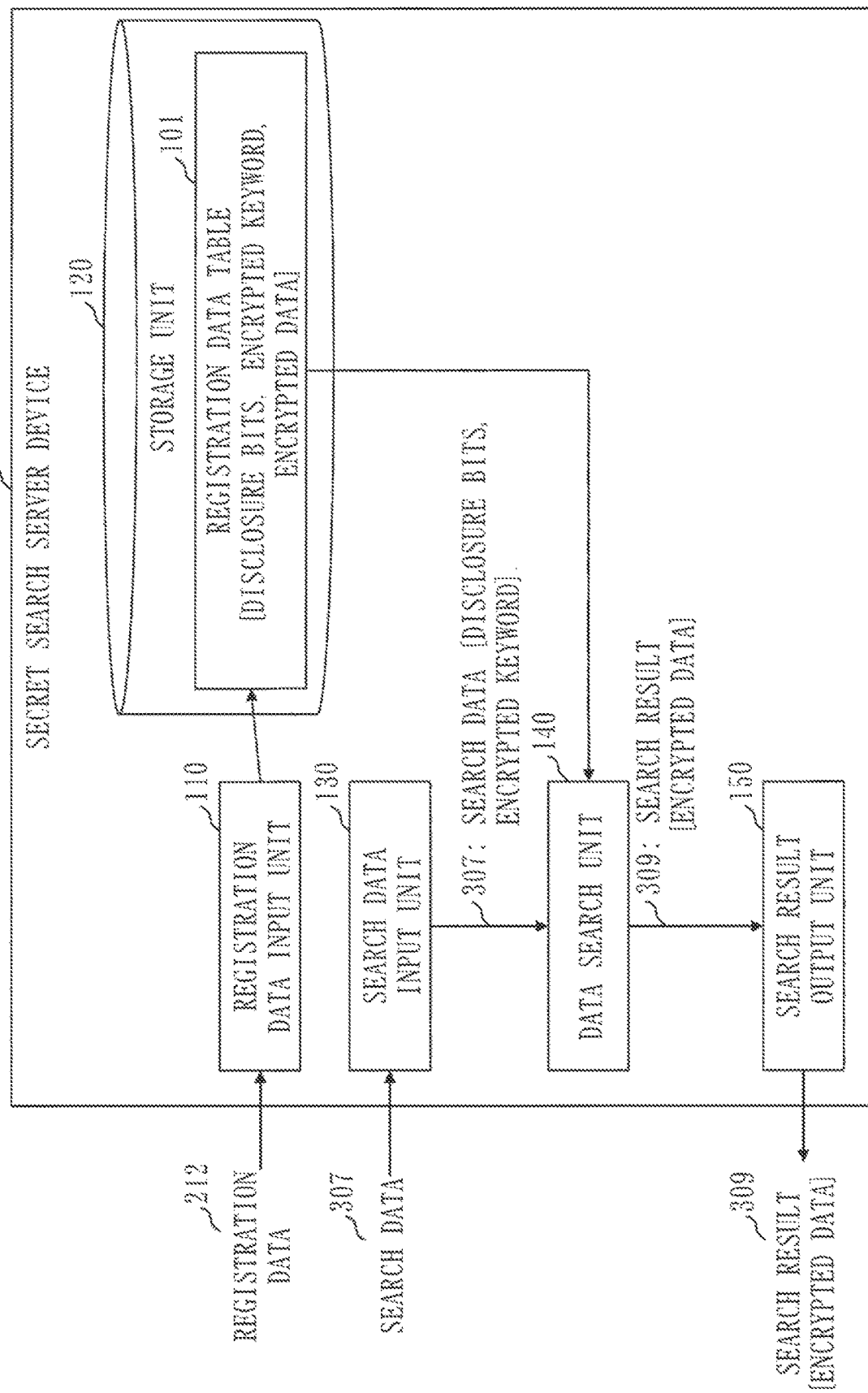
FIG. 2 is a figure illustrating an example of a configuration of a secret search server device 10 according to Embodiment 1.

FIG. 2 illustrates an example of a configuration of the secret search server device 10. The secret search server device 10 includes a registration data input unit 110, a storage unit 120, a search data input unit 130, a data search unit 140, and a search result output unit 150.

The registration data input unit 110 accepts registration data 212, and registers the accepted registration data 212 in a registration data table 101.

The registration data 212 is data composed of disclosure bits, an encrypted keyword, and encrypted data. The disclosure bits are data that is disclosed externally. The encrypted keyword is data used to search for the encrypted data, and is a keyword 200 that has been encrypted. The encrypted data is data 201 that has been encrypted.

The registration data table 101 manages data composed of disclosure bits, an encrypted keyword, and encrypted data. The registration data table 101 may manage a plurality of pieces of data.

The storage unit 120 stores the registration data table 101.

The search data input unit 130 accepts search data 307, and transmits the accepted search data 307 to the data search unit 140.

The search data 307 is data that is composed of disclosure bits and an encrypted keyword and is used to search for data registered in the registration data table 101.

The data search unit 140 accepts the search data 307 from the search data input unit 130, searches the registration data table 101 for data corresponding to the received search data 307, generates a search result 309 indicating a search result, and transmits the generated search result 309 to the search result output unit 150.

The search result output unit 150 receives the search result 309 from the data search unit 140, and outputs the received search result 309 externally.

Figure 3:
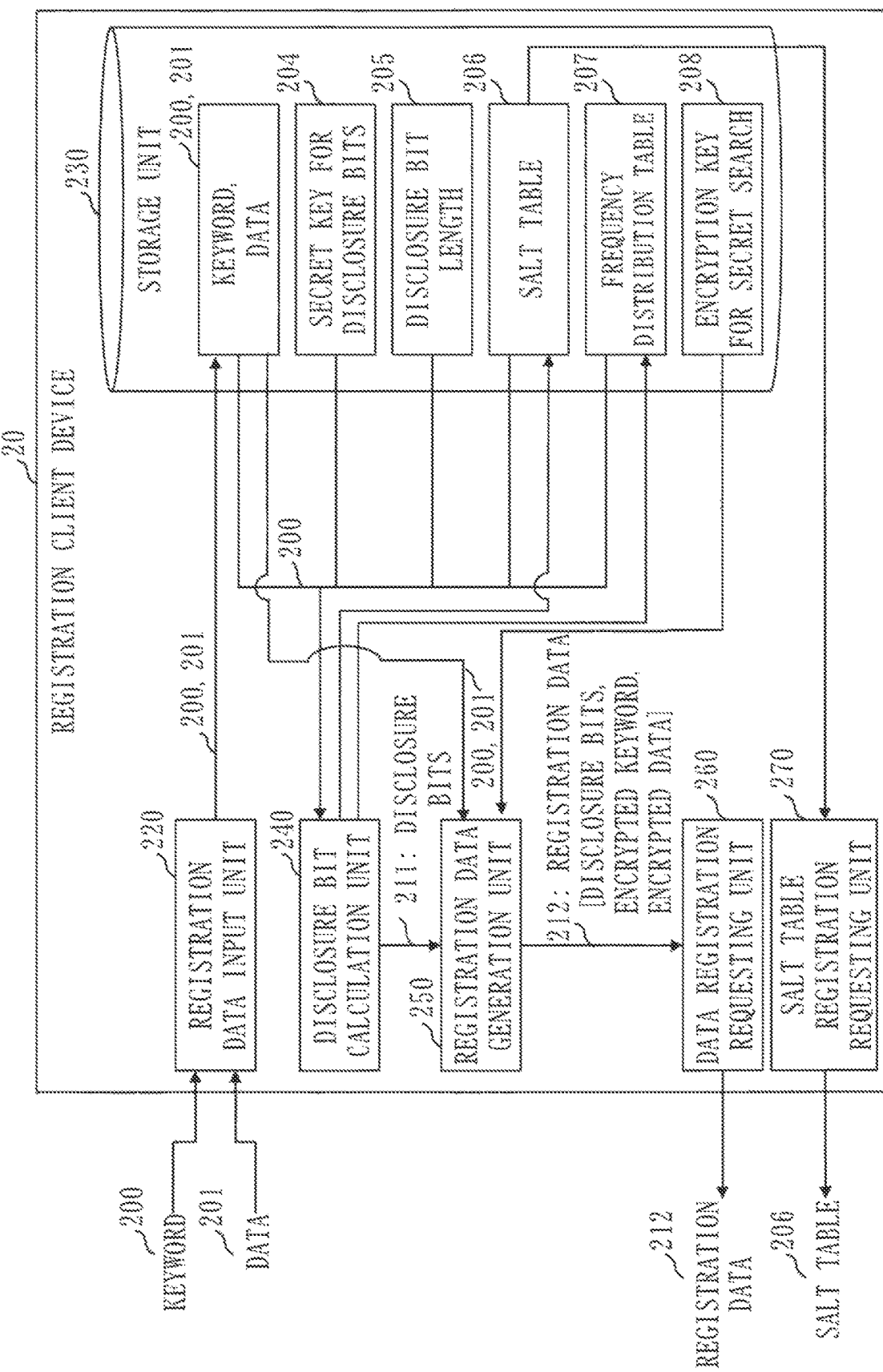
FIG. 3 is a figure illustrating an example of a configuration of a registration client device 20 according to Embodiment 1.

FIG. 3 illustrates an example of a configuration of the registration client device 20. The registration client device 20 includes a data input unit 220, a storage unit 230, a disclosure bit calculation unit 240, a registration data generation unit 250, a data registration requesting unit 260, and a salt table registration requesting unit 270. The registration client device 20 registers one or more pieces of data 201 to be searched for in secrecy and one or more keywords 200 respectively corresponding to the one or more pieces of data 201 in the secret search server device 10. The registration client device 20 also discloses disclosure bits. The disclosure bits are part of data that is calculated deterministically using each keyword 200 registered in the secret search server device 10 and a salt corresponding to each keyword 200 registered in the secret search server device 10, and is disclosed externally. The registration client device 20 discloses the disclosure bits at least to the secret search server device 10. Registering the data 201 and the keyword 200 in the secret search server device 10 includes registering the data 201 and the keyword 200 that have been encrypted in the secret search server device 10.

The data input unit 220 accepts the data 201 and the keyword 200, and records the accepted data 201 and keyword 200 in the storage unit 230.

The data 201 is data to be registered in the secret search server device 10 and is plaintext data.

The keyword 200 is a keyword for searching for the data 201 and is plaintext data.

The storage unit 230 stores the data 201, the keyword 200, a secret key for disclosure bits 204, a disclosure bit length 205, a salt table 206, a frequency distribution table 207, and an encryption key for secret search 208.

The secret key for disclosure bits 204 is data that indicates a secret key used to calculate the disclosure bits.

The disclosure bit length 205 is data that indicates a data size of the disclosure bits.

The salt table 206 is data that indicates a list of salts used to calculate disclosure bits 211. In the salt table 206, salts corresponding to each keyword may be grouped together. Note that the salt table 206 is not disclosed to the secret search server device 10.

The frequency distribution table 207 is also called a disclosure bit frequency distribution table, and is data that indicates a frequency distribution of disclosure bits disclosed by the registration client device 20.

The encryption key for secret search 208 is an encryption key used to encrypt the data 201 and the keyword 200.

The disclosure bit calculation unit 240 refers to the frequency distribution table 207, and calculates the disclosure bits 211 using the keyword 200, the secret key for disclosure bits 204, and a salt indicated in the salt table 206. The disclosure bit calculation unit 240 determines, as a determined salt, a salt corresponding to a registration keyword, which is the keyword 200 to be registered in the secret search server device 10. At this time, the disclosure bit calculation unit 240 determines the determined salt, taking into consideration the size of a bias in a distribution composed of disclosure bits already disclosed by the registration client device 20 and disclosure bits calculated using the registration keyword and the determined salt. The disclosure bit calculation unit 240 may determine the determined salt based on a salt managed by a storage unit 420 of the salt table management device 40 as a salt corresponding to the registration keyword. The disclosure bit calculation unit 240 may determine, as the determined salt, a salt other than the salt managed by the storage unit 420 of the salt table management device 40 as a salt corresponding to the registration keyword. If the occurrence frequency of the keyword 200 to be registered by the registration client device 20 is known, the disclosure bit calculation unit 240 may calculate a candidate for a salt to be determined by the disclosure bit calculation unit 240 as the determined salt, based on the known occurrence frequency. That the occurrence frequency of the keyword 200 to be registered by the registration client device 20 is known includes that the occurrence frequency of the keyword 200 to be registered by the registration client device 20 can be estimated.

The registration data generation unit 250 generates an encrypted keyword and encrypted data using the keyword 200, the data 201, and the encryption key for secret search 208. The registration data generation unit 250 receives the disclosure bits 211 from the disclosure bit calculation unit 240, generates registration data 212 using the received disclosure bits 211 and the generated encrypted keyword and encrypted data, and transmits the generated registration data 212 to the data registration requesting unit 260.

The data registration requesting unit 260 receives the registration data 212 from the registration data generation unit 250, transmits the received registration data 212 to the secret search server device 10, and requests the secret search server device 10 to register the registration data 212.

The salt table registration requesting unit 270 outputs the salt table 206 stored in the storage unit 230 to the salt table management device 40.

Figure 4:
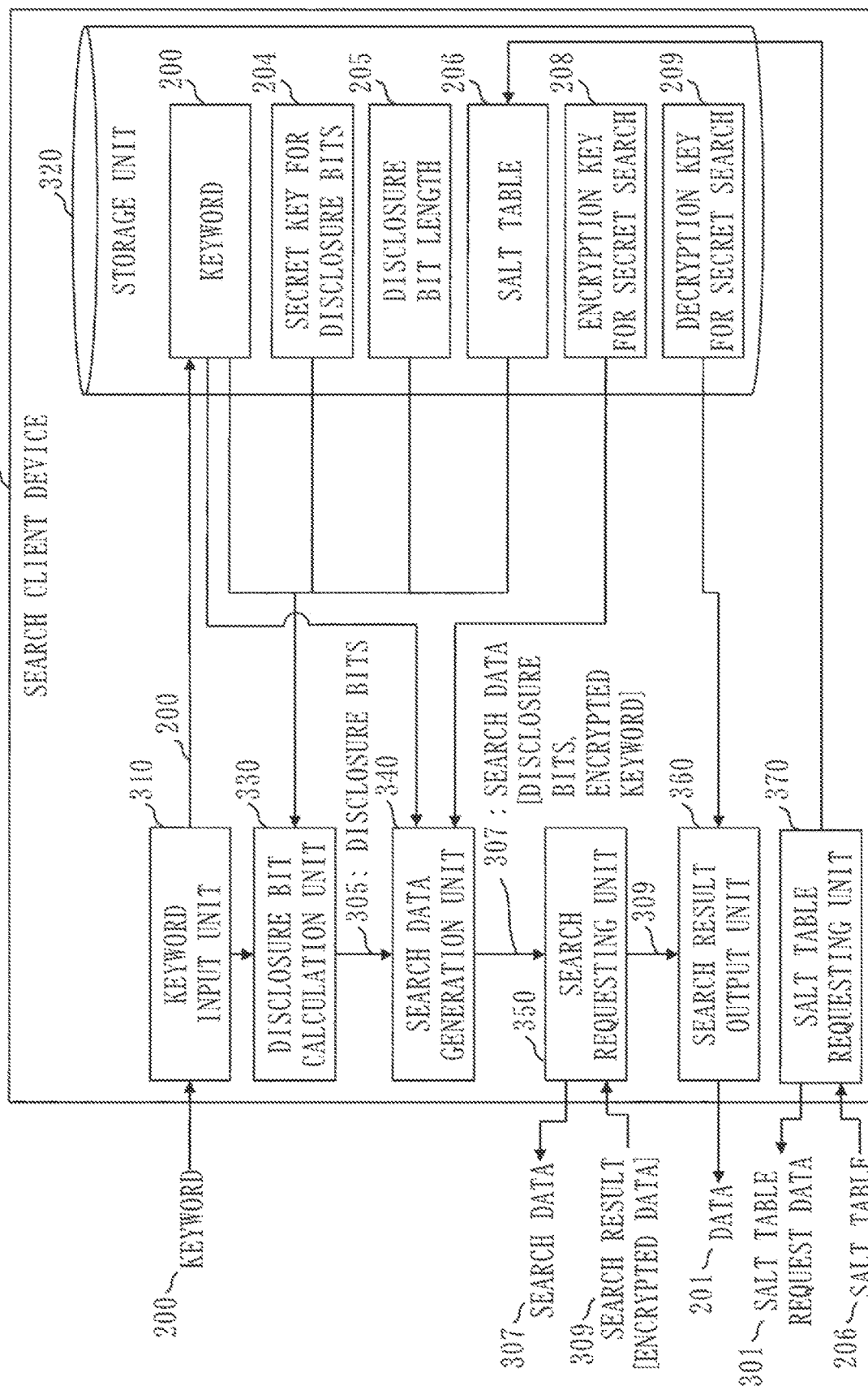
FIG. 4 is a figure illustrating an example of a configuration of a search client device 30 according to Embodiment 1.

FIG. 4 illustrates an example of a configuration of the search client device 30. The search client device 30 includes a keyword input unit 310, a storage unit 320, a disclosure bit calculation unit 330, a search data generation unit 340, a search requesting unit 350, a search result output unit 360, and a salt table requesting unit 370.

The keyword input unit 310 accepts the keyword 200, stores the accepted keyword 200 in the storage unit 320, and also transmits the accepted keyword 200 to the disclosure bit calculation unit 330.

The storage unit 320 stores the keyword 200, the secret key for disclosure bits 204, the disclosure bit length 205, the salt table 206, the encryption key for secret search 208, and a decryption key for secret search 209.

The decryption key for secret search 209 is data that indicates a decryption key used to decrypt the search result 309.

The disclosure bit calculation unit 330 accepts the keyword 200 from the keyword input unit 310, and calculates disclosure bits 305 using the received keyword 200 and the secret key for disclosure bits 204. When searching for the data 201 registered in the secret search server device 10, the disclosure bit calculation unit 330 may use every salt corresponding to each keyword 200 registered in the secret search server device 10. In this case, in order to reduce the amount of memory usage, the storage unit 320 may store every salt corresponding to each keyword 200 registered in the secret search server device 10 without duplication, instead of storing the salt table 206.

The search data generation unit 340 generates an encrypted keyword using the keyword 200 and the encryption key for secret search 208. The search data generation unit 340 receives the disclosure bits 305 from the disclosure bit calculation unit 330, generates the search data 307 using the received disclosure bits 305 and the generated encrypted keyword, and transmits the generated search data 307 to the search requesting unit 350.

The search requesting unit 350 receives the search data 307 from the search data generation unit 340, transmits the received search data 307 to the secret search server device 10, and requests the secret search server device 10 to search for data corresponding to the search data 307. The search requesting unit 350 receives the search result 309 corresponding to the transmitted search data 307 from the secret search server device 10, and transmits the received search result 309 to the search result output unit 360.

The search result output unit 360 receives the search result 309 from the search requesting unit 350, decrypts the received search result 309 using the decryption key for secret search 209 so as to generate the data 201, and outputs the generated data 201.

The salt table requesting unit 370 transmits salt table request data 301 to the salt table management device 40. The salt table requesting unit 370 receives the salt table 206 corresponding to the transmitted salt table request data 301 from the salt table management device 40, and records the received salt table 206 in the storage unit 320.

The salt table request data 301 is data indicating a request for the salt table 206. The salt table request data 301 may be information indicating a request for only salts corresponding to a certain keyword among the salts indicated in the salt table 206 managed by the salt table management device 40, or may be information indicating a request for the salts indicated in the salt table 206 managed by the salt table management device 40 without duplication.

Figure 5:
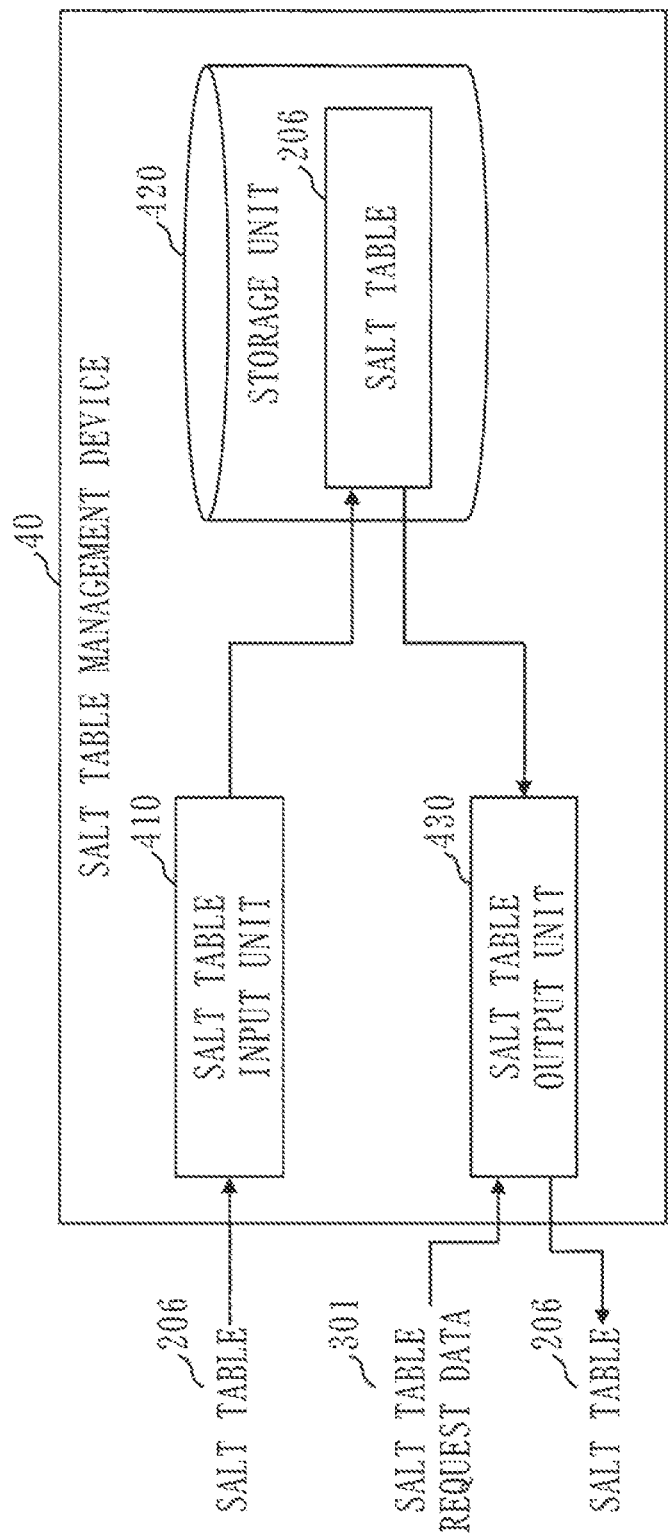
FIG. 5 is a figure illustrating an example of a configuration of a salt table management device 40 according to Embodiment 1.

FIG. 5 illustrates an example of a configuration of the salt table management device 40. The salt table management device 40 includes a salt table input unit 410, the storage unit 420, and a salt table output unit 430.

The salt table input unit 410 receives the salt table 206 from the registration client device 20, and records the received salt table 206 in the storage unit 420. If the occurrence frequency of the keyword 200 to be registered by the registration client device 20 is known, the salt table input unit 410 may calculate a candidate for a salt to be determined as a determined salt by the disclosure bit calculation unit 240, based on the known occurrence frequency.

The storage unit 420 stores the salt table 206. The storage unit 420 manages each salt corresponding to each keyword 200 registered in the secret search server device 10.

The salt table output unit 430 receives the salt table request data 301 from the search client device 30, and transmits the salt table 206 stored in the storage unit 420 and corresponding to the received salt table request data 301 to the search client device 30 that has transmitted the salt table request data 301.

Figure 6:
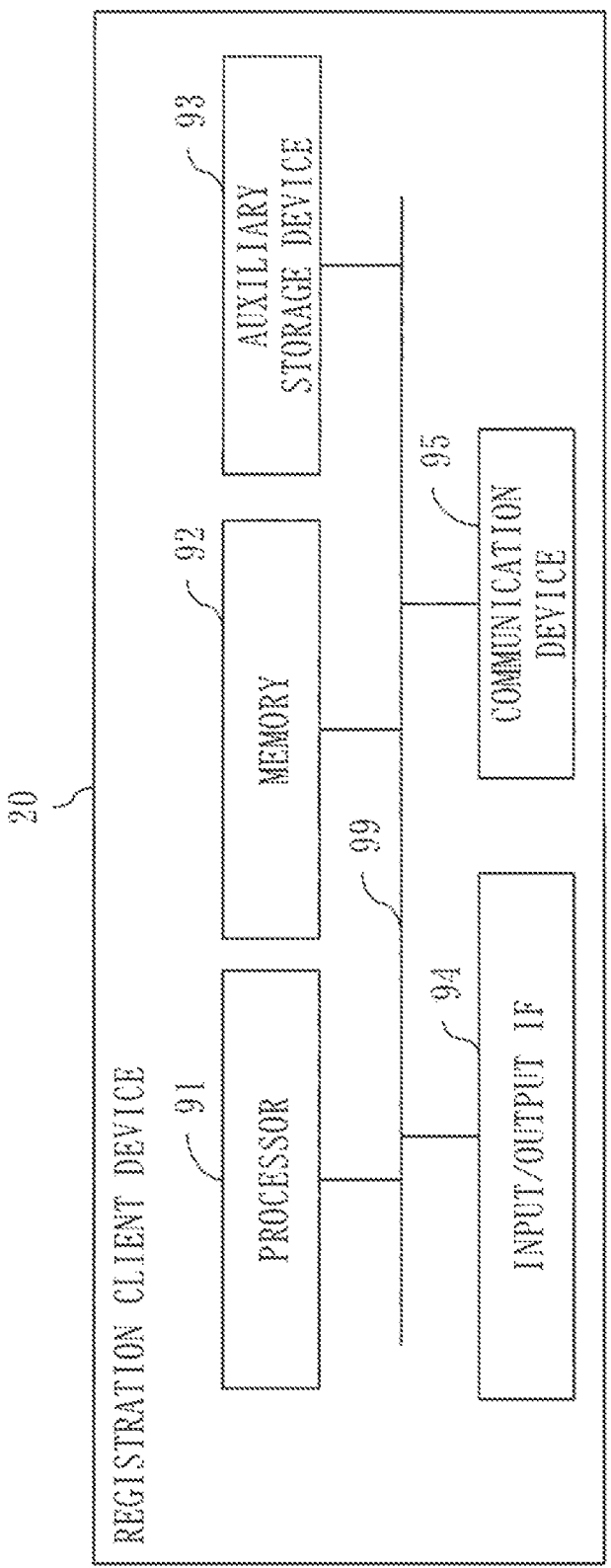
FIG. 6 is a figure illustrating an example of a hardware configuration of the registration client device 20 according to Embodiment 1.

FIG. 6 illustrates an example of a hardware configuration of the registration client device 20 according to this embodiment. The registration client device 20 is composed of a computer. The registration client device 20 may be composed of a plurality of computers.

As illustrated in this figure, the registration client device 20 is a computer that includes hardware such as a processor 91, a memory 92, an auxiliary storage device 93, an input/output interface (IF) 94, and a communication device 95. These hardware components are connected with one another through a signal line 99.

The processor 91 is an integrated circuit (IC) that performs operational processing, and controls the hardware included in the computer. The processor 91 is, as a specific example, a central processing unit (CPU), a digital signal processor (DSP), or a graphics processing unit (GPU).

The registration client device 20 may include a plurality of processors as an alternative to the processor 91. The plurality of processors share the role of the processor 91.

The memory 92 is, typically, a volatile storage device. The memory 92 is also called a main storage device or a main memory. The memory 92 is, as a specific example, a random access memory (RAM). Data stored in the memory 92 is saved in the auxiliary storage device 93 as necessary.

The auxiliary storage device 93 is, typically, a non-volatile storage device. The auxiliary storage device 93 is, as a specific example, a read only memory (ROM), a hard disk drive (HDD), or a flash memory. Data stored in the auxiliary storage device 93 is loaded into the memory 92 as necessary.

The memory 92 and the auxiliary storage device 93 may be configured integrally.

The input/output IF 94 is a port to which an input device and an output device are connected. The input/output IF 94 is, as a specific example, a Universal Serial Bus (USB) terminal. The input device is, as a specific example, a keyboard and a mouse. The output device is, as a specific example, a display.

The communication device 95 is a receiver and a transmitter. The communication device 95 is, as a specific example, a communication chip or a network interface card (NIC).

Each unit of the registration client device 20 may use the input/output IF 94 and the communication device 95 as appropriate when communicating with other devices and so on.

The auxiliary storage device 93 stores a secret search program. The secret search program is a program that causes a computer to realize the functions of each unit included in the registration client device 20. The secret search program is loaded into the memory 92 and executed by the processor 91. The functions of each unit included in the registration client device 20 are realized by software.

Data used when the secret search program is executed, data obtained by executing the secret search program, and so on are stored in a storage device as appropriate. Each unit of the registration client device 20 uses the storage device as appropriate. The storage unit 230 is composed of the storage device. As a specific example, the storage device is composed of at least one of the memory 92, the auxiliary storage device 93, a register in the processor 91, and a cache memory in the processor 91. Data and information may have substantially the same meaning. The storage device may be independent of the computer.

The functions of the memory 92 and the auxiliary storage device 93 may be realized by other storage devices.

The secret search program may be recorded in a computer readable non-volatile recording medium. The non-volatile recording medium is, as a specific example, an optical disc or a flash memory. The secret search program may be provided as a program product.

The hardware configuration of each device, other than the registration client device 20, included in the secret search system 1 may be substantially the same as the hardware configuration of the registration client device 20.

Description of Operation

A procedure for operation of each device constituting the secret search system 1 is equivalent to a secret search method. A program that realizes the operation of each device constituting the secret search system 1 is equivalent to the secret search program. The secret search program is a collective term for programs that operate in the devices that constitute the secret search system 1.

An example of operation characteristic of the present disclosure will be mainly described below. In addition to the operation described below, the secret search system 1 operates by appropriately employing known techniques.

Figure 7:
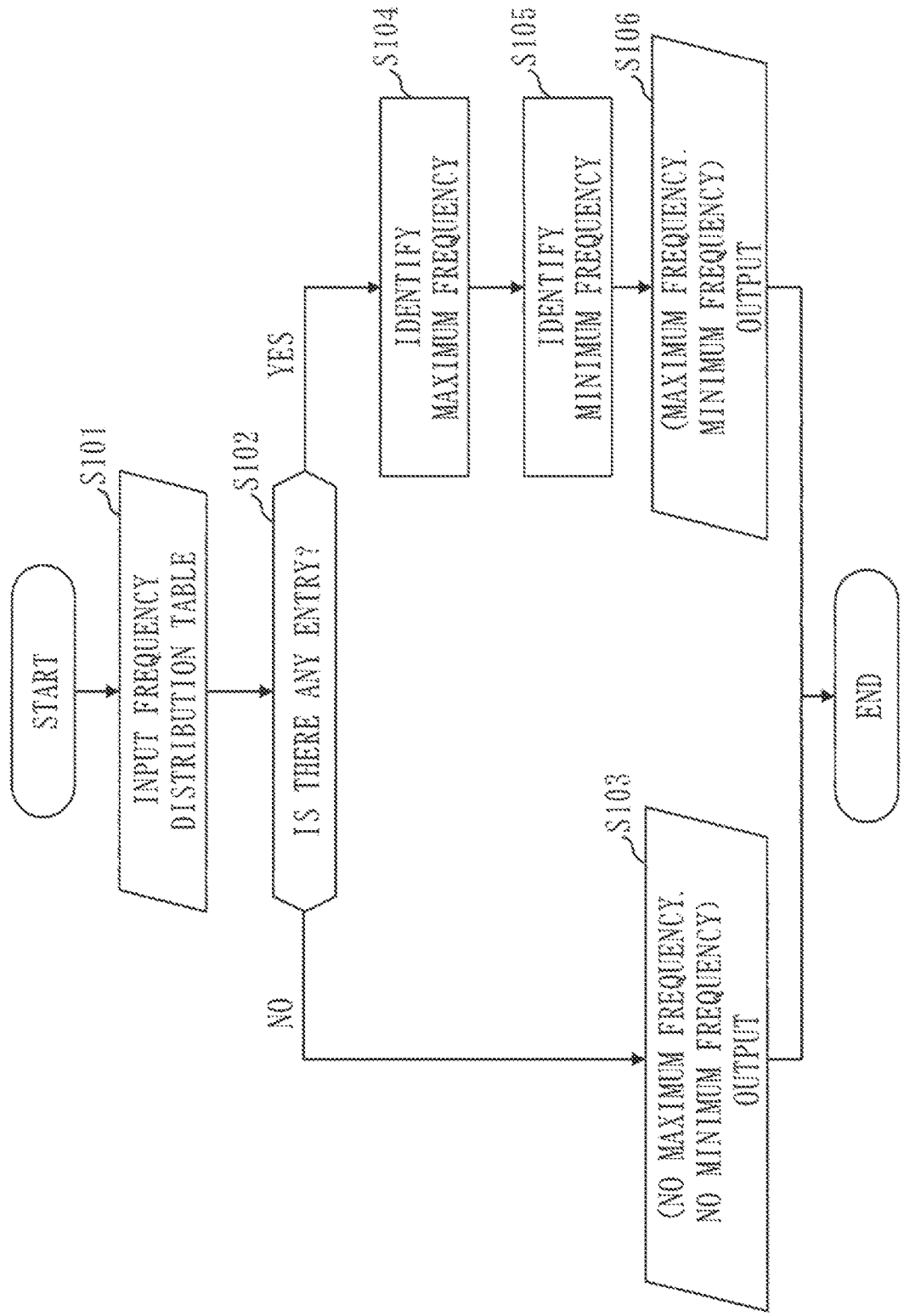
FIG. 7 is a flowchart illustrating operation of a disclosure bit calculation unit 240 according to Embodiment 1.

FIG. 7 is a flowchart illustrating an example of processing by which the disclosure bit calculation unit 240 acquires the maximum frequency and the minimum frequency of disclosure bits. Referring to this figure, the operation of the disclosure bit calculation unit 240 will be described.

(Step S101)

The frequency distribution table 207 is input to the disclosure bit calculation unit 240. If the disclosure bit calculation unit 240 can refer to the frequency distribution table 207 stored in the storage unit 230, the disclosure bit calculation unit 240 may skip this step.

(Step S102)

If there is no entry in the frequency distribution table 207 that is referred to, the disclosure bit calculation unit 240 proceeds to step S103. In other cases, the disclosure bit calculation unit 240 proceeds to step S104.

(Step S103)

The disclosure bit calculation unit 240 outputs information indicating that there is no maximum frequency and there is no minimum frequency.

(Step S104)

The disclosure bit calculation unit 240 identifies the maximum frequency among the frequencies indicated in the frequency distribution table 207.

(Step S105)

The disclosure bit calculation unit 240 identifies the minimum frequency among the frequencies indicated in the frequency distribution table 207.

(Step S106)

The disclosure bit calculation unit 240 outputs the identified maximum frequency and minimum frequency. The disclosure bit calculation unit 240 may output the identified maximum frequency and minimum frequency internally in the disclosure bit calculation unit 240.

Figure 8:
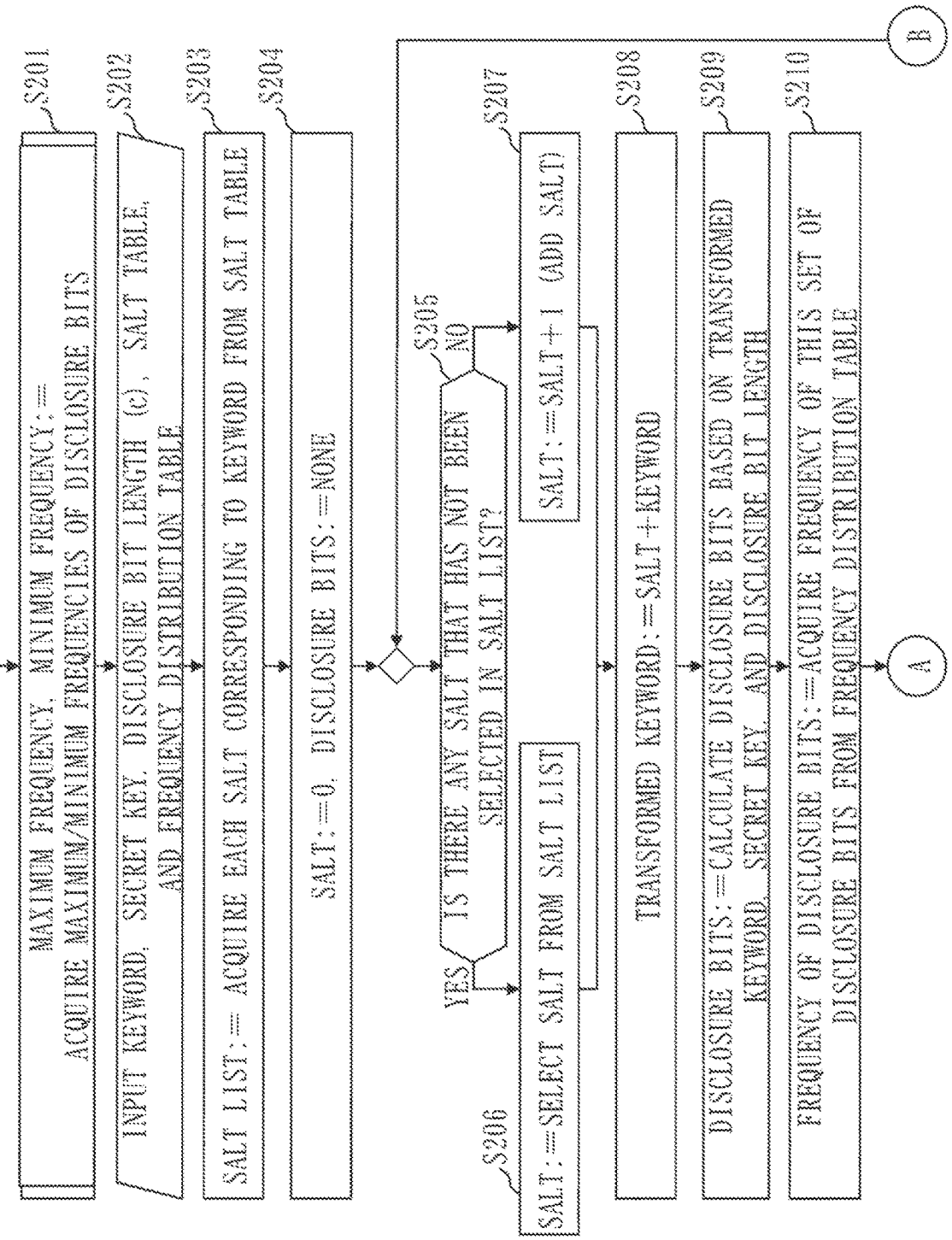
FIG. 8 is a flowchart illustrating operation of the registration client device 20 according to Embodiment 1.
Figure 9:
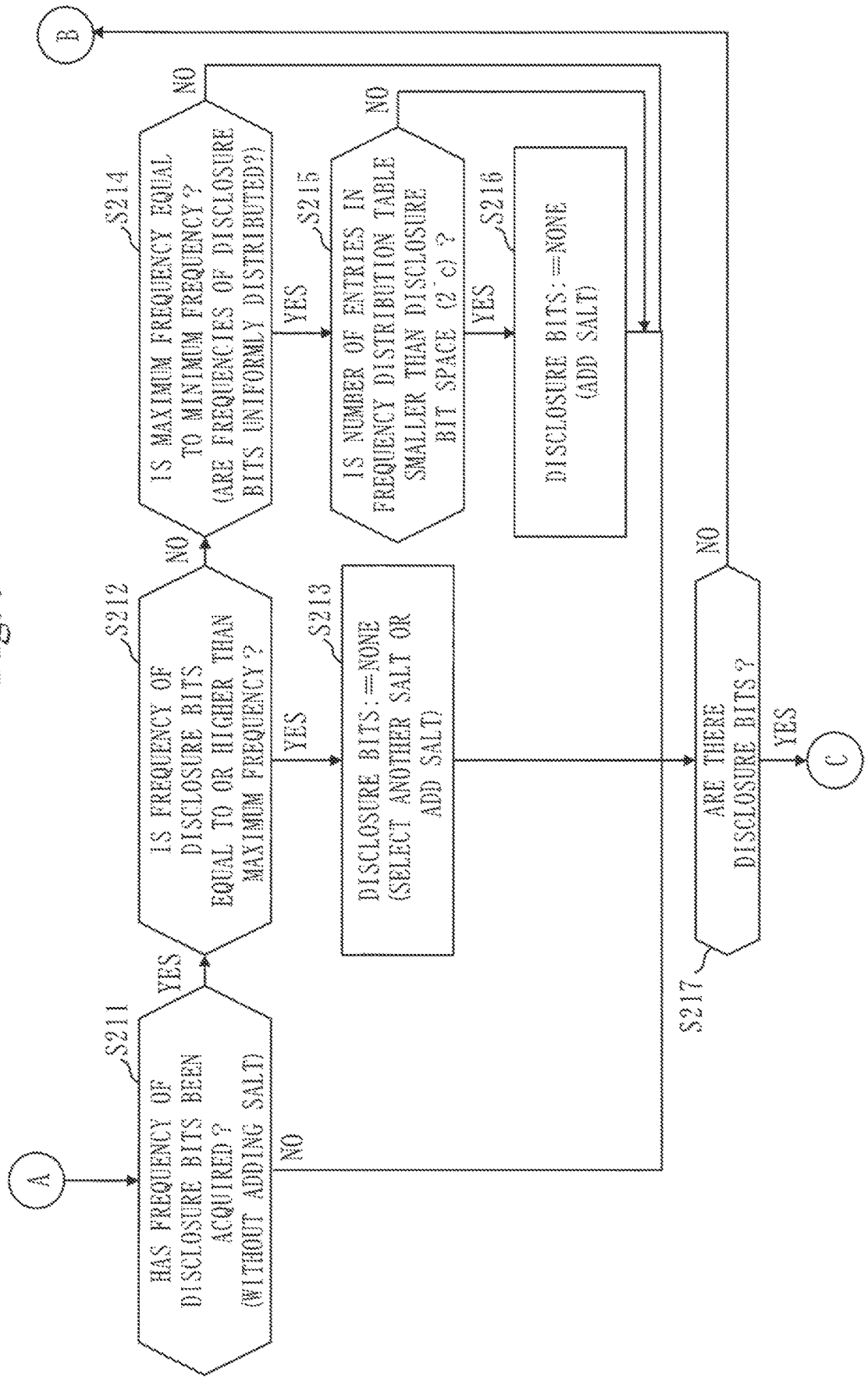
FIG. 9 is a flowchart illustrating operation of the registration client device 20 according to Embodiment 1.
Figure 10:
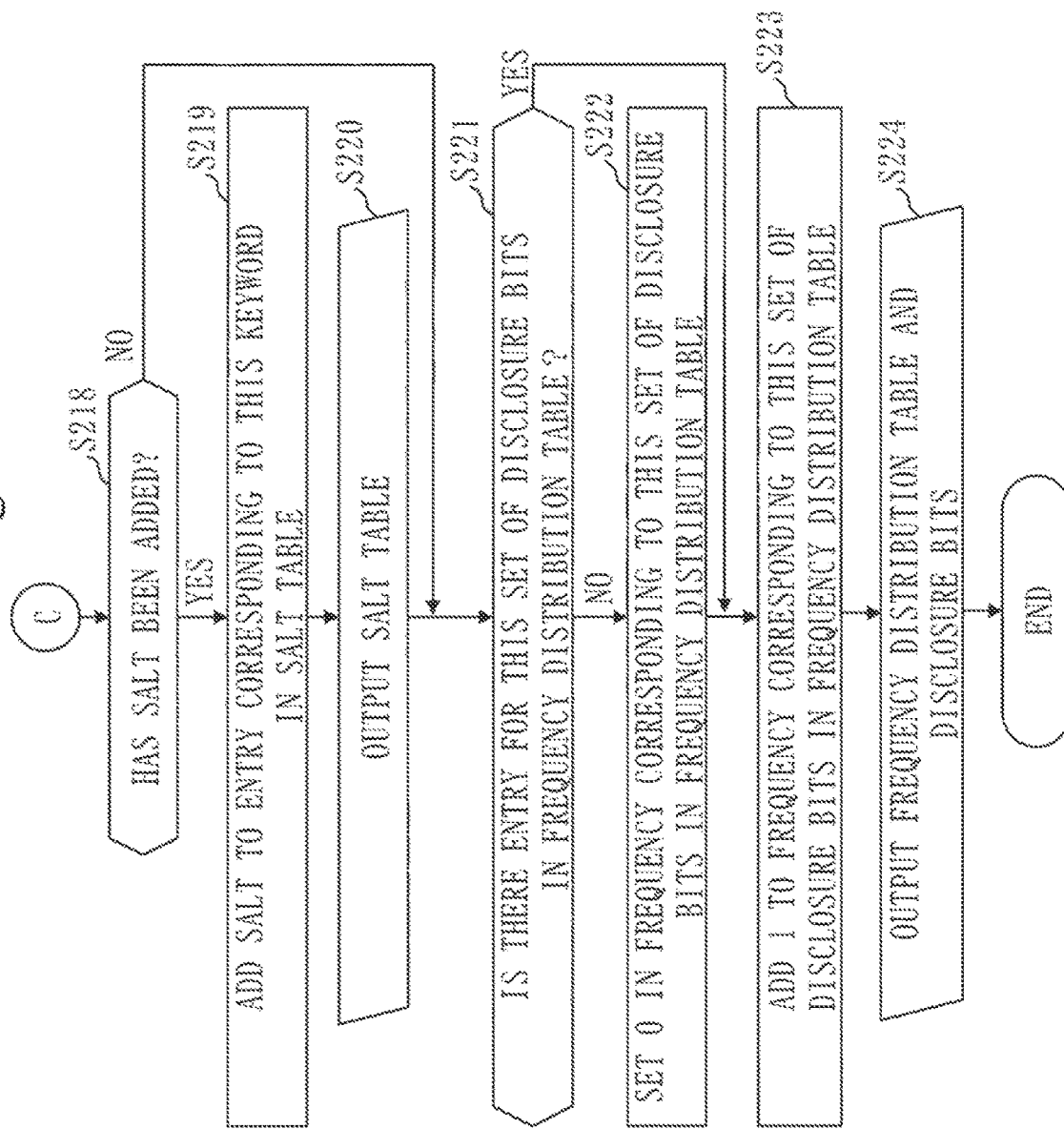
FIG. 10 is a flowchart illustrating operation of the registration client device 20 according to Embodiment 1.

FIGS. 8 to 10 are a flowchart illustrating an example of the operation of the registration client device 20. Referring to these figures, the operation of the registration client device 20 will be described.

(Step S201)

The disclosure bit calculation unit 240 acquires the maximum frequency and the minimum frequency indicated in the frequency distribution table 207. In this step, the disclosure bit calculation unit 240 executes the processing indicated in FIG. 7.

(Step S202)

The keyword 200 to be registered, the secret key for disclosure bits 204, the disclosure bit length 205, the salt table 206, and the frequency distribution table 207 are input to the disclosure bit calculation unit 240. If the disclosure bit calculation unit 240 can refer to these pieces of data stored in the storage unit 230, the disclosure bit calculation unit 240 may skip this step.

(Step S203)

The disclosure bit calculation unit 240 acquires each salt corresponding to the keyword 200 to be registered from the salt table 206, and generates a salt list using each acquired salt.

(Step S204)

The disclosure bit calculation unit 240 assigns 0 as a salt value and assumes that there are no disclosure bits.

(Step S205)

If there is a salt that has not been selected in the processing of this flowchart in the salt list generated in step S203, the disclosure bit calculation unit 240 proceeds to step S206. In other cases, the disclosure bit calculation unit 240 proceeds to step S207.

(Step S206)

The disclosure bit calculation unit 240 selects, as a selected salt, a salt that has not been selected in the processing of this flowchart from the salts included in the salt list.

(Step S207)

The disclosure bit calculation unit 240 adds a new salt to the salt list. It is assumed here that the new salt is a salt that is not identical with any salt included in the salt list. The disclosure bit calculation unit 240 selects the new salt as a selected salt.

(Step S208)

The disclosure bit calculation unit 240 calculates a transformed keyword using the selected salt and the keyword 200 to be registered. The transformed keyword may be the logical sum of the selected salt and the keyword 200 to be registered, or may be obtained by adding the salt to the keyword 200 at any position. As a specific example, when the keyword 200 to be registered is "AAA" and the salt is "1", the transformed keyword may be "AAA1", "1AAA", or "A1AA".

(Step S209)

The disclosure bit calculation unit 240 calculates disclosure bits using the calculated transformed keyword, the secret key for disclosure bits 204, and the disclosure bit length 205. The disclosure bit calculation unit 240 sets, as the disclosure bits, consecutive bits of the length of the disclosure bit length 205 out of data calculated using the transformed keyword and the secret key for disclosure bits 204.

(Step S210)

The disclosure bit calculation unit 240 acquires a frequency corresponding to the calculated disclosure bits from the frequency distribution table 207.

(Step S211)

If a frequency cannot be acquired in step S210, or if a new salt is added to the salt list, the disclosure bit calculation unit 240 proceeds to step S217. In other cases, the disclosure bit calculation unit 240 proceeds to step S212.

(Step S212)

If the frequency acquired in step S210 is the maximum frequency or higher, the disclosure bit calculation unit 240 proceeds to step S213. In other cases, the disclosure bit calculation unit 240 proceeds to step S214.

(Step S213)

The disclosure bit calculation unit 240 assumes that there are no disclosure bits. After executing this step, the disclosure bit calculation unit 240 selects another salt or add a new salt to the salt list.

(Step S214)

If the maximum frequency and the minimum frequency are equal, that is, if the frequency distribution of disclosure bits indicated in the frequency distribution table 207 is a uniform distribution, the disclosure bit calculation unit 240 proceeds to step S215. In other cases, the disclosure bit calculation unit 240 proceeds to step S217.

(Step S215)

If the number of entries in the frequency distribution table 207 is smaller than the size of a disclosure bit space, the disclosure bit calculation unit 240 proceeds to step S216. In other cases, the disclosure bit calculation unit 240 proceeds to step S217. The size of the disclosure bit space is $2^c$, where c is the disclosure bit length 205.

(Step S216)

The disclosure bit calculation unit 240 assumes that there are no disclosure bits. After executing this step, the disclosure bit calculation unit 240 adds a new salt to the salt list.

(Step S217)

If there are no disclosure bits, the disclosure bit calculation unit 240 proceeds to step S205. In other cases, the disclosure bit calculation unit 240 proceeds to step S218.

(Step S218)

If a new salt is added in step S207, the disclosure bit calculation unit 240 proceeds to step S219. In other cases, the disclosure bit calculation unit 240 proceeds to step S221.

(Step S219)

The disclosure bit calculation unit 240 adds a new salt to the entry corresponding to the keyword 200 to be registered among the entries in the salt table 206.

(Step S220)

The salt table registration requesting unit 270 outputs the salt table 206.

(Step S221)

If there is no entry corresponding to the disclosure bits calculated in step S209 in the frequency distribution table 207, the disclosure bit calculation unit 240 proceeds to step S222. In other cases, the disclosure bit calculation unit 240 proceeds to step S223. Note that a salt corresponding to a transformed keyword corresponding to the above disclosure bits is the determined salt.

(Step S222)

In the frequency distribution table 207, the disclosure bit calculation unit 240 sets a frequency corresponding to the disclosure bits calculated in step S209 as 0.

(Step S223)

In the frequency distribution table 207, the disclosure bit calculation unit 240 adds 1 to the frequency corresponding to the disclosure bits calculated in step S209.

(Step S224)

The disclosure bit calculation unit 240 outputs the frequency distribution table 207 modified in step S223 and the disclosure bits calculated in step S209. The disclosure bit calculation unit 240 may update the frequency distribution table 207 stored in the storage unit 230 to the frequency distribution table 207 modified in step S223.

Figure 11:
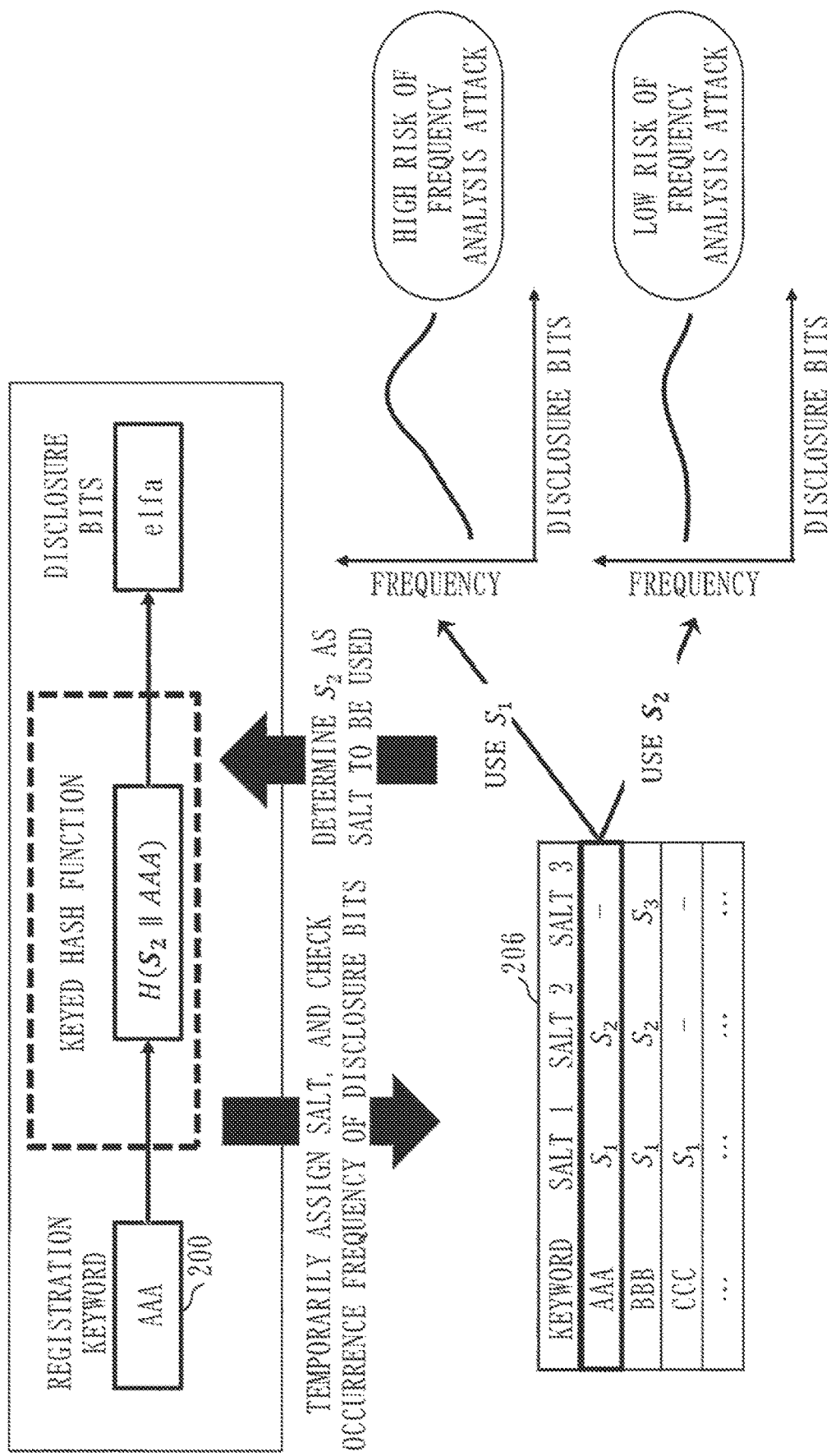
FIG. 11 is a figure describing processing by the disclosure bit calculation unit 240 according to Embodiment 1.

Using FIG. 11, a specific example of processing by which the disclosure bit calculation unit 240 determines a salt will be described. It is assumed here that a registration keyword, which is the keyword 200, is "AAA" and that the disclosure bit calculation unit 240 calculates disclosure bits based on data calculated using a keyed hash function. In the salt table 206, keywords and each salt corresponding to each of the keywords are indicated, and a salt $s_1$ and a salt $s_2$ are indicated as salts corresponding to the registration keyword "AAA".

The disclosure bit calculation unit 240 checks the occurrence frequency of disclosure bits by temporarily assigning a salt. Specifically, in a case where disclosure bits are calculated using the salt $s_1$, when this set of disclosure bits is disclosed, the bias in the frequency distribution of disclosure bits disclosed by the registration client device 20 becomes relatively large. Therefore, a risk of being subject to a frequency analysis attack increases in this case. On the other hand, in a case where disclosure bits are calculated using the salt $s_2$, even when this set of disclosure bits is disclosed, the bias in the frequency distribution of disclosure bits disclosed by the registration client device 20 remains relatively small. Therefore, the risk of being subject to a frequency analysis attack remains low in this case.

Therefore, in this example, the disclosure bit calculation unit 240 determines the salt $s_2$ as the salt to be used for the registration keyword "AAA".

Using the flowchart, a specific example where the disclosure bit calculation unit 240 determines a size of the bias in the frequency distribution of disclosure bits based on the maximum frequency and the minimum frequency has been described. However, the disclosure bit calculation unit 240 may determine a size of the bias in the frequency distribution of disclosure bits based on other indicators such as a value of variance. The disclosure bit calculation unit 240 does not need to select a salt so that the size of the bias in the frequency distribution of disclosure bits is minimized (as a specific example, so that the frequency distribution of disclosure bits is uniform), and may select a salt so that the size of the bias in the frequency distribution of disclosure bits is within a certain allowable range.

Figure 12:
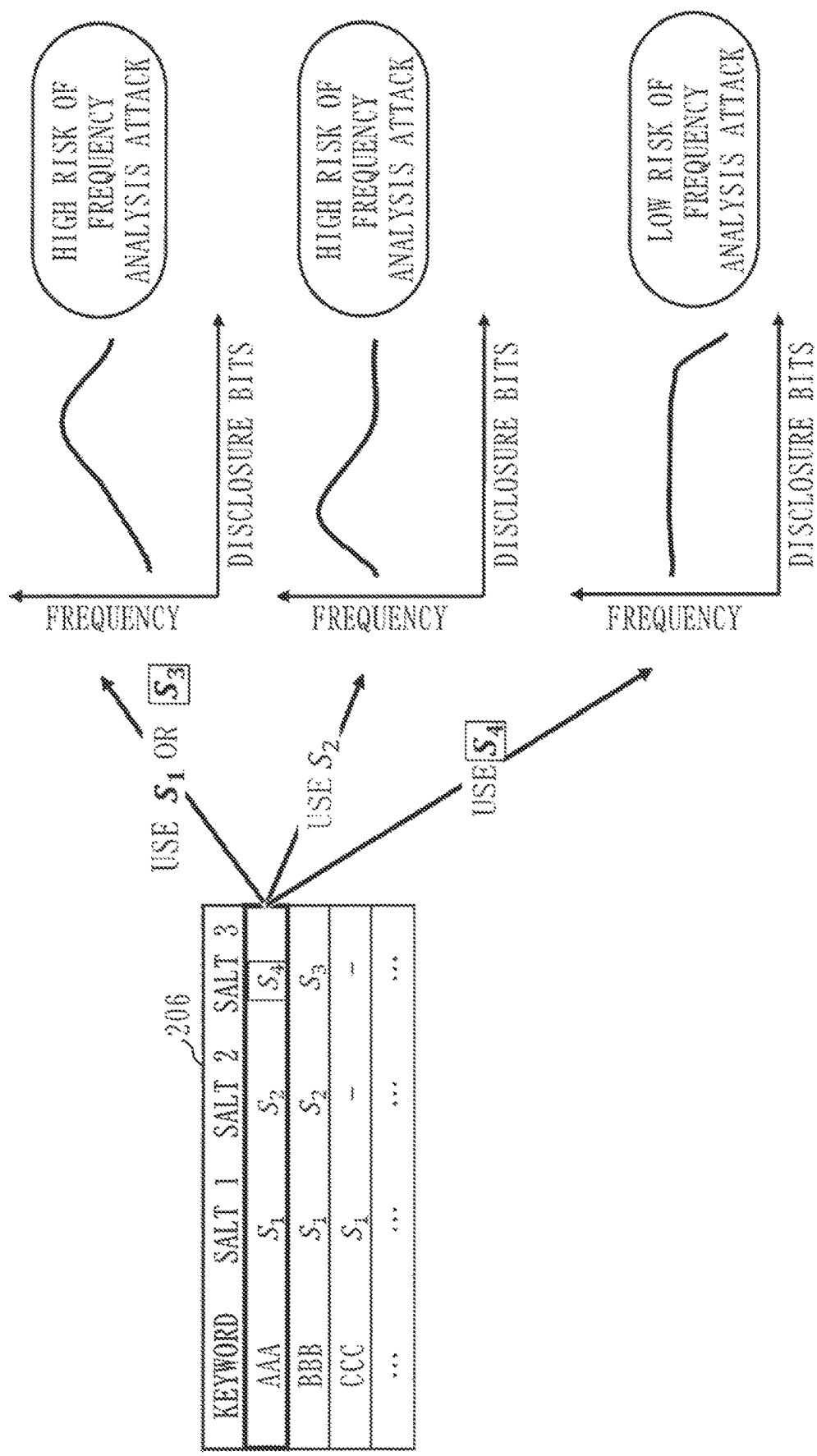
FIG. 12 is a figure describing processing by the disclosure bit calculation unit 240 according to Embodiment 1.

Using FIG. 12, a specific example of processing by the disclosure bit calculation unit 240 in a case where the disclosure bit calculation unit 240 uses a new salt will be described. It is assumed here that the disclosure bit calculation unit 240 determines a salt to be used for the registration keyword "AAA". It is also assumed that the disclosure bit calculation unit 240 has determined that using the salt $s_1$ or the salt $s_2$ will result in a relatively large bias in the frequency distribution of disclosure bits.

Therefore, the disclosure bit calculation unit 240 first calculates disclosure bits corresponding to the registration keyword "AAA" using a salt $s_3$ as a new salt, and calculates the frequency distribution of disclosure bits disclosed by the registration client device 20 in a case where this set of disclosure bits is disclosed. The bias in the calculated frequency distribution is relatively large, so that the disclosure bit calculation unit 240 does not select the salt $s_3$.

Next, the disclosure bit calculation unit 240 calculates disclosure bits corresponding to the registration keyword "AAA" using a salt $s_4$ as a new salt, and calculates the frequency distribution of disclosure bits disclosed by the registration client device 20 in a case where this set of disclosure bits is disclosed. The bias in the calculated frequency distribution is relatively small, so that the disclosure bit calculation unit 240 selects the salt $s_4$ as the salt corresponding to the registration keyword "AAA".

A specific example where one salt is added to the salt table 206 has been presented, but a plurality of salts may be added to the salt table 206.

Figure 13:
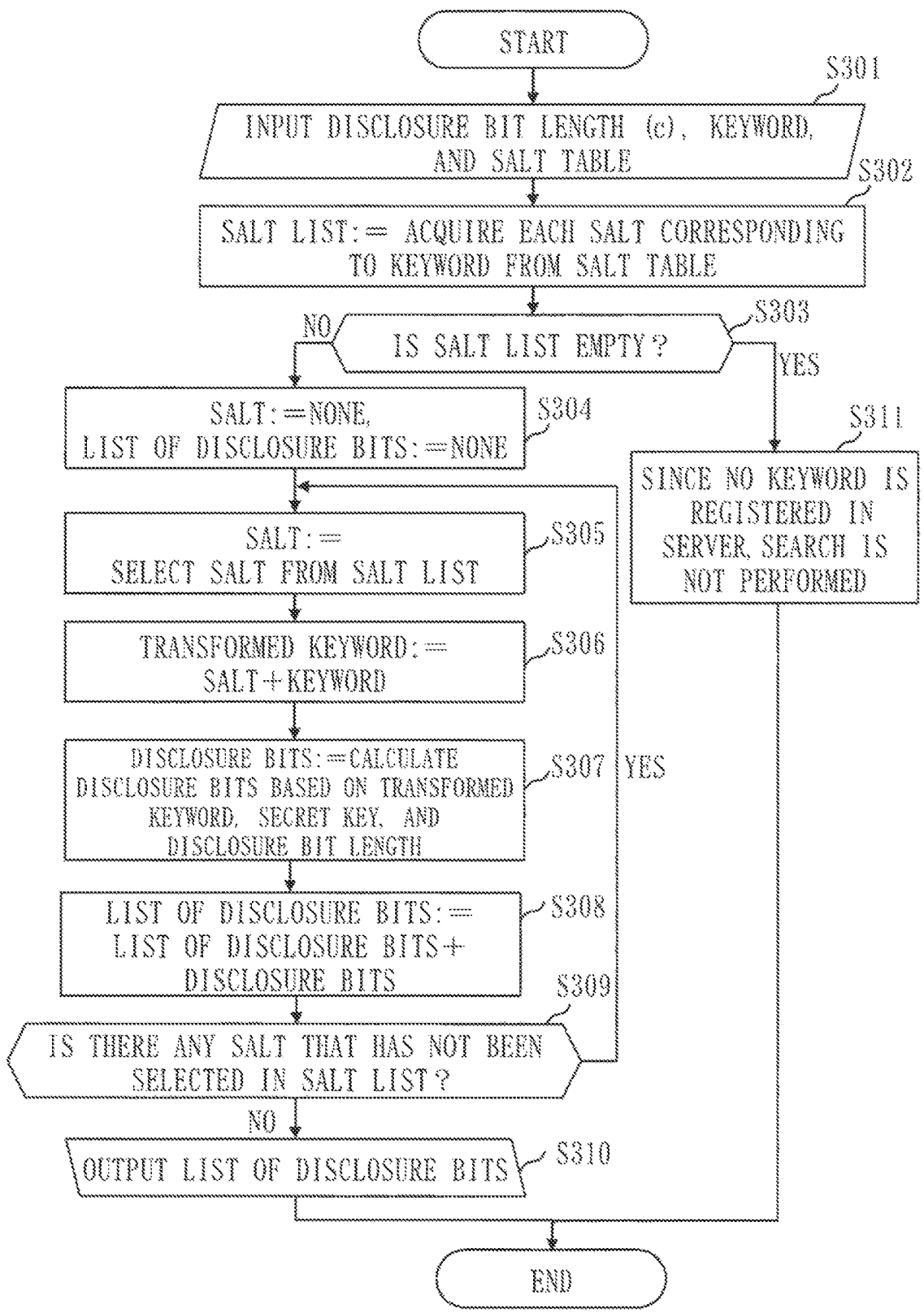
FIG. 13 is a flowchart illustrating operation of the search client device 30 according to Embodiment 1.

FIG. 13 is a flowchart illustrating an example of operation of the search client device 30. Referring to this figure, the operation of the search client device 30 will be described.
(Step S301)
The disclosure bit length 205, the keyword 200 to be searched for, and the salt table 206 are input to the disclosure bit calculation unit 330. If the disclosure bit calculation unit 330 can refer to the frequency distribution table 207 stored in the storage unit 320, the disclosure bit calculation unit 330 may skip this step.
(Step S302)
The disclosure bit calculation unit 330 acquires each salt corresponding to the keyword 200 to be searched for from the salt table 206, and generates a salt list using each acquired salt.
(Step S303)
If the generated salt list is empty, the disclosure bit calculation unit 330 proceeds to step S311. In other cases, the disclosure bit calculation unit 330 proceeds to step S304.
(Step S304)
The disclosure bit calculation unit 330 assigns 0 as a salt value, and assumes that there is no list of disclosure bits.
(Step S305)
The disclosure bit calculation unit 330 select, as a selected salt, a salt that has not been selected in the processing of this flowchart from among the salts included in the salt list.
(Step S306)
The disclosure bit calculation unit 330 calculates a transformed keyword using the selected salt and the keyword 200 to be searched for. The method for calculating the transformed keyword is as described in step S208. Note that the same method for calculating the transformed keyword needs to be used when the registration client device 20 performs registration and when the search client device 30 performs a search.
(Step S307)
The disclosure bit calculation unit 330 calculates disclosure bits using the calculated transformed keyword, the secret key for disclosure bits 204, and the disclosure bit length 205.
(Step S308)
The disclosure bit calculation unit 330 adds the calculated disclosure bits to a list of disclosure bits.
(Step S309)
If there is a salt that has not been selected in the processing of this flowchart in the salt list, the disclosure bit calculation unit 330 proceeds to step S305. In other cases, the disclosure bit calculation unit 330 proceeds to step S310.
(Step S310)
The disclosure bit calculation unit 330 outputs the list of disclosure bits.
(Step S311)
Since data corresponding to the keyword 200 to be searched for is not registered in the secret search server device 10, the disclosure bit calculation unit 330 ends the processing of this flowchart without searching for data corresponding to the keyword 200.

Figure 14:
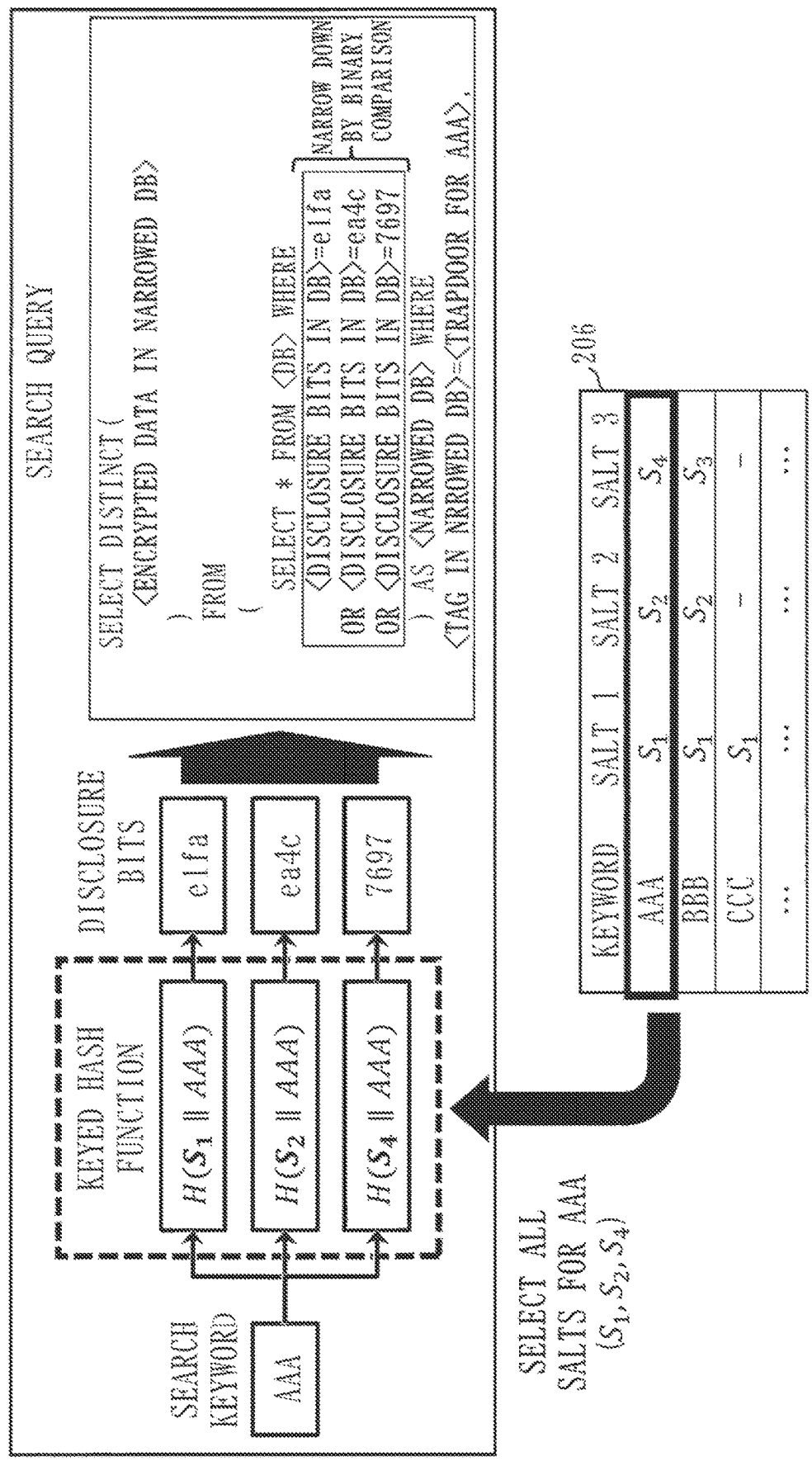
FIG. 14 is a figure describing a search process according to Embodiment 1.

Using FIG. 14, a specific example of processing performed in a search will be described. It is assumed that the search client device 30 searches for data corresponding to a search keyword "AAA", which is the keyword 200. In FIG. 14, a symbol "||" denotes concatenation of character strings. That is, "S1||AAA" denotes adding "S1", which is a salt, to the beginning of "AAA", which is a keyword.

First, the disclosure bit calculation unit 330 refers to the salt table 206, and calculates each set of disclosure bits corresponding to the search keyword "AAA" using every salt corresponding to the search keyword "AAA".

Next, the search requesting unit 350 transmits the search data 307 indicating every set of disclosure bits that has been calculated to the secret search server device 10.

Next, the search data input unit 130 receives the search data 307 and transmits the received search data 307 to the data search unit 140.

Next, the data search unit 140 receives the search data 307, and performs binary comparison between each set of disclosure bits indicated in the received search data 307 and each set of disclosure bits registered in the registration data table 101, so as to narrow down disclosure bits. A tag corresponding to each set of disclosure bits after narrowing down is a trapdoor corresponding to the search keyword "AAA". The time required for binary comparison is relatively short, so that a speed-up effect is maintained even if the number of sets of disclosure bits to be compared increases.

Description of Effects of Embodiment 1

As described above, according to Embodiment 1, a risk of a frequency analysis attack can be reduced while maintaining a speed-up effect and without requiring occurrence frequencies of keywords in advance in a searchable encryption technique based on probabilistic encryption.

Figure 15:
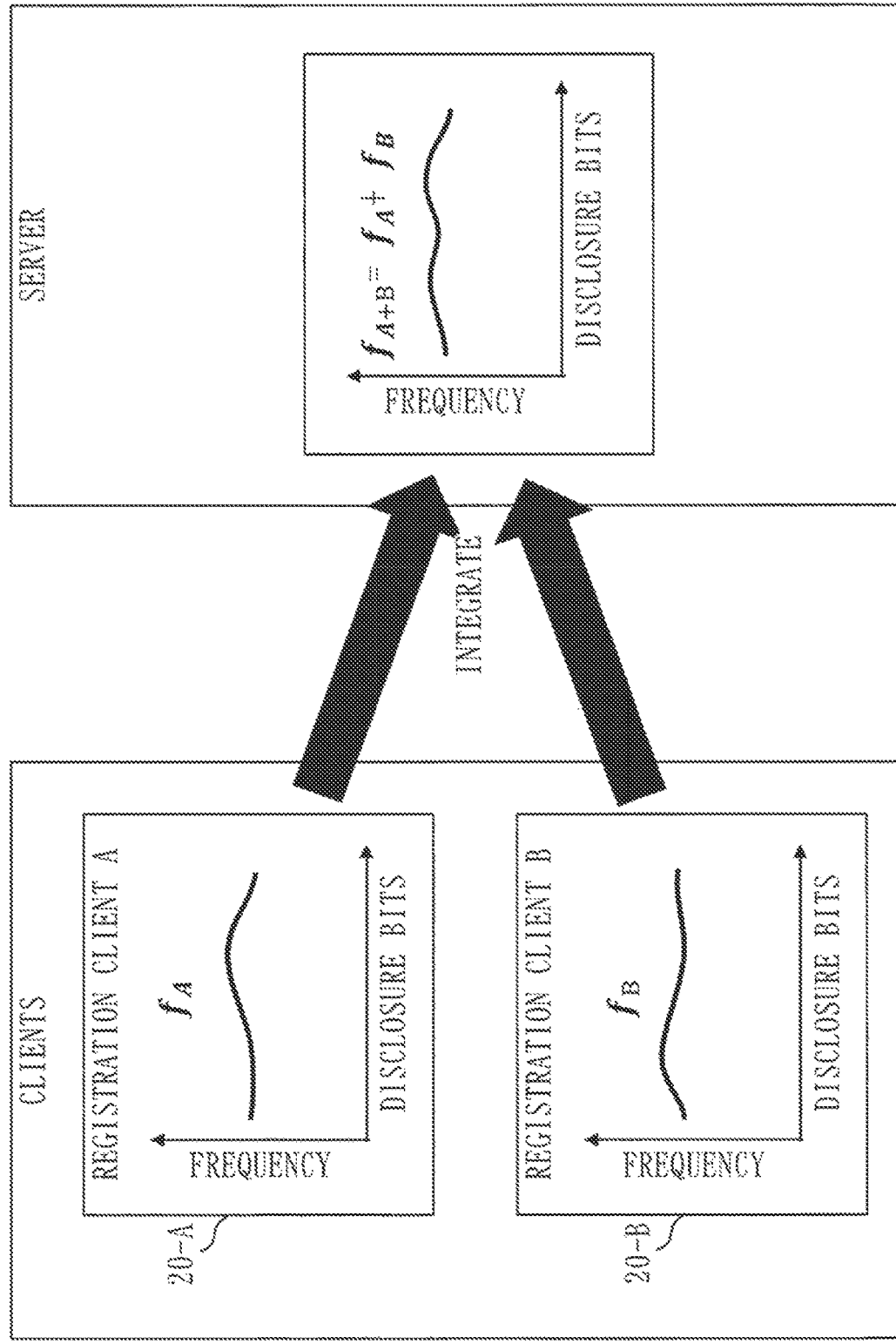
FIG. 15 is a figure describing effects of Embodiment 1.

Using FIG. 15, the effects of Embodiment 1 will be described. It is assumed that in a case where the secret search system 1 includes a registration client device 20-A and a registration client device 20-B, each of the registration client device 20-A and the registration client device 20-B independently manages the frequency distribution table 207. In this case, the bias is relatively small in both the frequency distribution table 207 managed by the registration client device 20-A and the frequency distribution table 207 managed by the registration client device 20-B. Therefore, the bias in a distribution obtained by integrating the frequency distribution table 207 managed by the registration client device 20-A and the frequency distribution table 207 managed by the registration client device 20-B is also relatively small. That is, according to Embodiment 1, also in the case where each of the registration client device 20-A and the registration client device 20-B independently manages the frequency distribution table 207, the bias in the frequency distribution of disclosure bits stored in the secret search server device 10 is relatively small. Substantially the same effect can also be obtained when third parties manage the frequency distribution table 207 of the registration client device 20-A and the frequency distribution table 207 of the registration client device 20-B.

Figure 16:
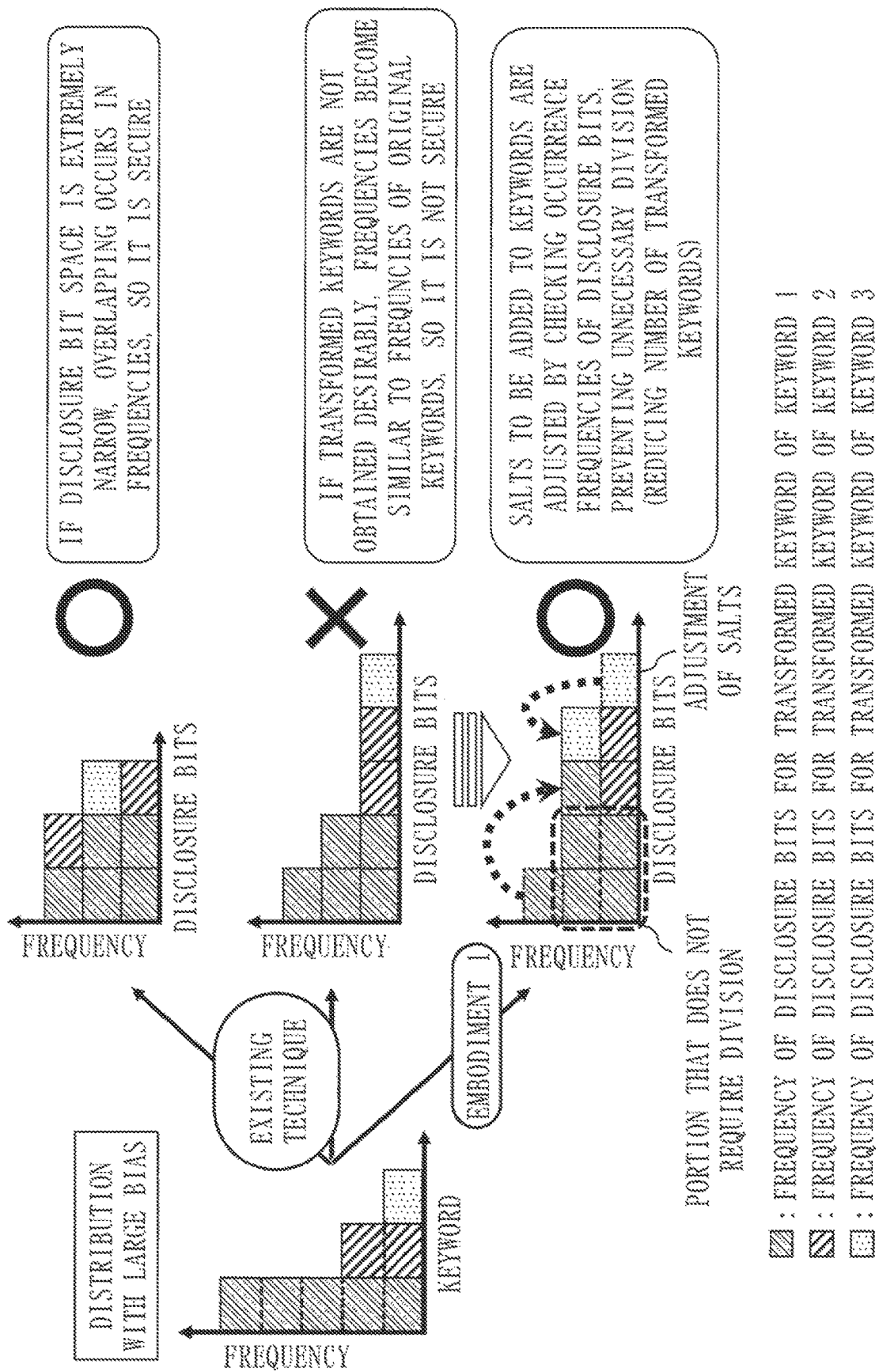
FIG. 16 is a figure describing effects of Embodiment 1.

Using FIG. 16, the technique disclosed in Patent Literature 1 will be considered. It is assumed here that the frequency distribution of keywords has a large bias. In this technique, if the disclosure bit space is extremely narrow, overlapping occurs in frequencies, so that there is relatively a low risk of a frequency analysis attack. However, depending on selection of transformed keywords, the disclosure bit space may become wide. If the disclosure bit space is wide, frequencies of disclosure bits are similar to frequencies of original keywords, so that there is a relatively high risk of a frequency analysis attack.

A case will be considered where Embodiment 1 is applied to the technique disclosed in Patent Literature 1. In this case, salts that are added to keywords are adjusted depending on the occurrence frequencies of disclosure bits that have been already disclosed. At this time, salts may be adjusted within the disclosure bit space. Therefore, in this case, keywords can be prevented from being divided unnecessarily. That is, by applying Embodiment 1 to the technique disclosed in Patent Literature 1, the number of transformed keywords can be reduced.

A problem in the technique disclosed in Patent Literature 1 is that when this technique is applied to disclosure bits, the frequency distribution of disclosure bits may be biased even if keywords are replaced with transformed keywords. However, this problem is solved by applying Embodiment 1 to the technique disclosed in Patent Literature 1.

Other Configurations

<Variation 1>

Figure 17:
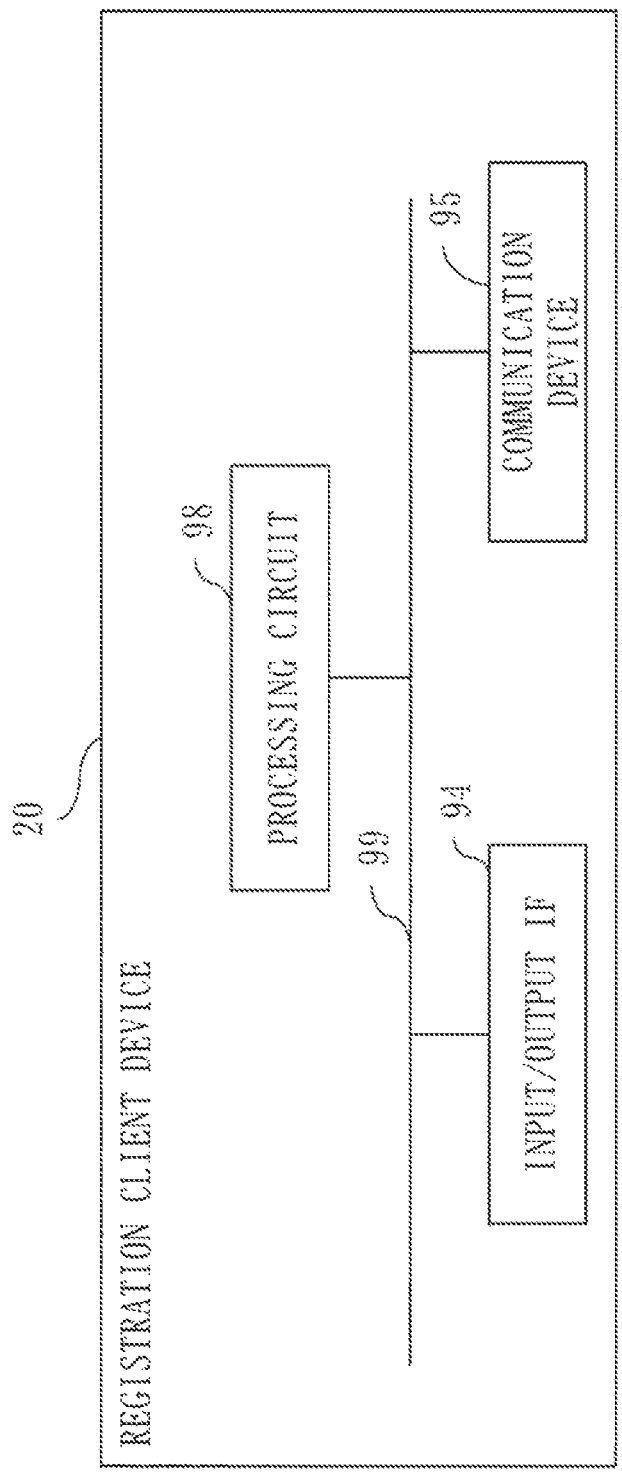
FIG. 17 is a figure illustrating an example of the hardware configuration of the registration client device 20 according to a variation of Embodiment 1.

FIG. 17 illustrates an example of a hardware configuration of the registration client device 20 according to this variation.

The registration client device 20 includes a processing circuit 98 in place of the processor 91, in place of the processor 91 and the memory 92, in place of the processor 91 and the auxiliary storage device 93, or in place of the processor 91, the memory 92, and the auxiliary storage device 93.

The processing circuit 98 is hardware that realizes at least part of the units included in the registration client device 20.

The processing circuit 98 may be dedicated hardware, or may be a processor that executes programs stored in the memory 92.

When the processing circuit 98 is dedicated hardware, the processing circuit 98 is, as a specific example, a single circuit, a composite circuit, a programmed processor, a parallel-programmed processor, an application specific integrated circuit (ASIC), a field programmable gate array (FPGA), or a combination of these.

The registration client device 20 may include a plurality of processing circuits as an alternative to the processing circuit 98. The plurality of processing circuits share the role of the processing circuit 98.

In the registration client device 20, some functions may be realized by dedicated hardware, and the remaining functions may be realized by software or firmware.

As a specific example, the processing circuit 98 is realized by hardware, software, firmware, or a combination of these.

The processor 91, the memory 92, the auxiliary storage device 93, and the processing circuit 98 are collectively called "processing circuitry". That is, the functions of the functional constituent elements of the registration client device 20 are realized by the processing circuitry.

Each device, other than the registration client device 20, that is included in the secret search system 1 may also be configured in substantially the same manner as this variation.

Other Embodiments

Embodiment 1 has been described, and portions of this embodiment may be implemented in combination. Alternatively, this embodiment may be partially implemented. Alternatively, this embodiment may be modified in various ways as necessary, and may be implemented as a whole or partially in any combination.

The embodiment described above is an essentially preferable example, and is not intended to limit the present disclosure as well as the applications and scope of uses of the present disclosure. The procedures described using the flowcharts or the like may be modified as appropriate.

REFERENCE SIGNS LIST

1: secret search system, 10: secret search server device, 101: registration data table, 110: registration data input unit, 120: storage unit, 130: search data input unit, 140: data search unit, 150: search result output unit, 20: registration client device, 200: keyword, 201: data, 204: secret key for disclosure bits, 205: disclosure bit length, 206: salt table, 207: frequency distribution table, 208: encryption key for secret search, 209: decryption key for secret search, 211: disclosure bits, 212: registration data, 220: data input unit, 230: storage unit, 240: disclosure bit calculation unit, 250: registration data generation unit, 260: data registration requesting unit, 270: salt table registration requesting unit, 30: search client device, 301: salt table request data, 305: disclosure bits, 307: search data, 309: search result, 310: keyword input unit, 320: storage unit, 330: disclosure bit calculation unit, 340: search data generation unit, 350: search requesting unit, 360: search result output unit, 370: salt table requesting unit, 40: salt table management device, 410: salt table input unit, 420: storage unit, 430: salt table output unit, 50: network, 91: processor, 92: memory, 93: auxiliary storage device, 94: input/output IF, 95: communication device, 98: processing circuit, 99: signal line.

The invention claimed is:

1. A secret search system that employs a searchable encryption technique based on probabilistic encryption, the secret search system comprising
a registration client device to register at least one piece of data to be searched for in secrecy and at least one keyword corresponding to each of the at least one piece of data in a secret search server device, and disclose disclosure bits, the disclosure bits being data to be disclosed to the secret search server device and being part of data calculated deterministically using each keyword registered in the secret search server device and a salt corresponding to each keyword registered in the secret search server device,
wherein the registration client device includes
processing circuitry to determine a salt corresponding to a registration keyword as a determined salt, the registration keyword being a keyword to be registered in the secret search server device, and
wherein the processing circuitry of the registration client device determines the determined salt, based on a size of a bias in a distribution composed of disclosure bits already disclosed by the registration client device and disclosure bits calculated using the registration keyword and the determined salt.

2. The secret search system according to claim 1, further comprising
a salt table management device including a storage device to store each salt corresponding to each keyword registered in the secret search server device.

3. The secret search system according to claim 2,
wherein the processing circuitry of the registration client device determines the determined salt, based on a salt stored in the storage device of the salt table management device as a salt corresponding to the registration keyword.

4. The secret search system according to claim 3,
wherein the processing circuitry of the registration client device determines, as the determined salt, a salt other than the salt stored in the storage device of the salt table management device as the salt corresponding to the registration keyword.

5. The secret search system according to claim 2,
wherein the salt table management device further includes processing circuitry to, when an occurrence frequency of a keyword to be registered by the registration client device is known, calculate a candidate for a salt to be determined as the determined salt, based on the known occurrence frequency.

6. The secret search system according to claim 1,
wherein when an occurrence frequency of a keyword to be registered by the registration client device is known, the processing circuitry of the registration client device calculates a candidate for a salt to be determined as the determined salt, based on the known occurrence frequency.

7. The secret search system according to claim 1, further comprising
a search client device including processing circuitry to search for data registered in the secret search server device,
wherein when performing a search for data registered in the secret search server device, the processing circuitry of the search client device calculates the disclosure bits using every salt corresponding to each keyword registered in the secret search server device.

8. A secret search method that is executed by a registration client device in a secret search system that employs a searchable encryption technique based on probabilistic encryption, the registration client device being a computer that registers at least one piece of data to be searched for in secrecy and at least one keyword corresponding to each of the at least one piece of data in a secret search server device, and discloses disclosure bits, the disclosure bits being data to be disclosed to the secret search server device and being part of data calculated deterministically using each keyword registered in the secret search server device and a salt corresponding to each keyword registered in the secret search server device, the secret search method comprising
determining a salt corresponding to a registration keyword as a determined salt, the registration keyword being a keyword to be registered in the secret search server device, by the computer,
wherein the computer determines the determined salt, based on a size of a bias in a distribution composed of disclosure bits already disclosed by the registration client device and disclosure bits calculated using the registration keyword and the determined salt.

9. A non-transitory computer readable medium storing a secret search program that is executed by a registration client device in a secret search system that employs a searchable encryption technique based on probabilistic encryption, the registration client device being a computer that registers at least one piece of data to be searched for in secrecy and at least one keyword corresponding to each of the at least one piece of data in a secret search server device, and discloses disclosure bits, the disclosure bits being data to be disclosed to the secret search server device and being part of data calculated deterministically using each keyword registered in the secret search server device and a salt corresponding to each keyword registered in the secret search server device, the secret search program causing the registration client device to execute a disclosure bit calculation process of determining a salt corresponding to a registration keyword as a determined salt, the registration keyword being a keyword to be registered in the secret search server device, the disclosure bit calculation process determining the determined salt, based on a size of a bias in a distribution composed of disclosure bits already disclosed by the registration client device and disclosure bits calculated using the registration keyword and the determined salt.

\* \* \* \* \*